United States Patent [19]
Slott et al.

[11] 3,912,590
[45] Oct. 14, 1975

[54] PROCEDURE FOR LIQUEFYING STARCH
[75] Inventors: Steen Slott, Bagsvaerd; Gerda Bente Madsen, Lyngby, both of Denmark
[73] Assignee: Novo Industri A/S, Bagsvaerd, Denmark
[22] Filed: Jan. 3, 1973
[21] Appl. No.: 320,724

[52] U.S. Cl. ................... 195/31 R; 195/62; 195/65
[51] Int. Cl.$^2$ ..................................... C12D 13/02
[58] Field of Search ............ 195/31 R, 66 R, 65, 62; 127/38, 32, 28

[56] References Cited
UNITED STATES PATENTS

| | | | |
|---|---|---|---|
| 3,371,018 | 2/1968 | Ewing et al. | 195/31 R |
| 3,551,293 | 12/1970 | Seidman et al. | 195/31 R |
| 3,654,081 | 4/1972 | Vance et al. | 195/31 R |
| 3,663,369 | 5/1972 | Morehouse et al. | 195/31 R |
| 3,756,919 | 9/1973 | Deaton | 195/31 R |

FOREIGN PATENTS OR APPLICATIONS

| | | | |
|---|---|---|---|
| 2,025,748 | 12/1970 | Germany | 195/65 |

OTHER PUBLICATIONS

Komaki et al., *Agr. Biol. Chem.*, Vol. 32, No. 7, pp. 860–872, (1968).
Barfoed, *Die Starke*, No. 9, pp. 291–295, (1967).

*Primary Examiner*—Lionel M. Shapiro
*Assistant Examiner*—Thomas G. Wiseman
*Attorney, Agent, or Firm*—Fidelman, Wolffe & Leitner

[57] ABSTRACT

Starch in aqueous suspension containing in excess of about 25% by weight of starch is completely liquefied and thinned in the presence of 0.02–0.1 weight percent of the alpha amylase from *B. licheniformis* by treating the starch suspension at a temperature in the range of 100°–115°C. for a time period in the range of 1 minute to 1 hour, followed optionally by a stabilization step effected at between 80°–100°C. The liquefied starch may then be saccharified without additional thermal processing to complete the solubilization of the starch.

8 Claims, No Drawings

PROCEDURE FOR LIQUEFYING STARCH

This invention relates to an improved method for enzymatic liquefaction and hydrolysis of starch wherein the starch is essentially completely solubilized and thinned during a relatively short time thermal treatment.

For the conversion of starch into saccharides such as glucose, maltose, etc. a double enzyme method has been widely suggested but used relatively little. Briefly, the double enzyme procedure involves enzymatic conversion of a 25-45 weight percent aqueous suspension of starch into a relatively low viscosity dextrin solution (with an alpha amylase), after which is effected an enzymatic conversion of the dextrin to the desired sugar e.g. to a high dextrose equivalent (D.E.) syrup (with an amylglucosidase). The double enzyme process offers the hope of better product yields than the acid/enzyme conversion process. For a more extensive discussion on enzymatic liquefaction and dextrinization of starch, reference is now made to U.S. Pat. No. 3,551,293, patented Dec. 29, 1970.

Cornstarch is particularly refractory to complete liquefaction as compared, for example, to sweet potato starch, gelatinizing at higher temperatures and dissolving with a higher residue of non-dissolved starch particles. Even small quantities of undissolved or of retrograded starch particles in the dextrinized starch solution are considered undesirable since they represent both product loss and impurities which must be removed. Their presence hinders filtration efforts to remove other insoluble matter from the dextrin solution. In some procedures suggested to the art, the dextrin solution produced by liquifying and thinning cornstarch is subsequently heated to at least about 120°C. in order to dissolve any residual cornstarch particles as is done, for example, in the procedures suggested by Komaki et al in Agricultural Biological Chemistry, Volume 32, No. 7, pp. 860-878 (1968).

The enzymatic starch liquefaction procedures heretofore suggested to the art represent compromises between procedural steps dictated by properties of starch and those dictated by the alphaamylase enzyme. All native starch materials, such as whole ground corn or wheat, corn starch, rice starch, potato starch, etc. remain essentially undissolved in cold water. Elevated water temperatures are required to effect gelation, but then viscosities of the starch become unmanageable. Presence of alpha-amylase in the suspension will thin or dextrinize the gelled starch. Unfortunately, the most thermally stable alpha-amylase heretofore available to the art rapidly loses its activity at elevated temperatures, and is largely ineffective at temperatures which otherwise would be selected for starch gelation and thinning. With particularly refractory starchy materials, notably whole corn and corn starch, the starch liquefaction procedures suggested to the art contemplate high enzyme concentrations, yet accept both rapid enzyme deactivation and incomplete gelation, the latter being evident from inclusion of a heating step (e.g. to 120°C.) following enzymatic thinning of the starch solution.

Desirably enzymatic liquefaction of starch should be a continuous or a semicontinuous procedure. It may be noted that U.S. Pat. No. 3,551,293 and the Komaki et al. article, both referenced above, contemplate continuous hydrolysis. Unfortunately, the thermal instability of alpha-amylase and the refractory character of starch seems to have forced the art further into compromise starch liquefaction systems when continuous procedures are under consideration. Enzymatic digestion with more than 0.2 weight percent of the alpha-amylase is contemplated by Komaki et al and by U.S. Pat. No. 3,551,293 (Examples 11 and 12).

High enzyme useage, and resulting high enzyme expenses, constitute a major objection to enzymatic liquefaction of starch. As compared to acid hydrolysis, the enzymatic liquefaction procedure is commercially attractive only if liquefaction and dextrinization of starch can be effected with reasonable consumption of alpha-amylase. The economics of enzymatic liquefaction of starch will, of course, be more favorable if the post liquefaction heating step employed to dissolve residual and retrograde starch can be omitted.

The present invention involves a continuous starch liquefaction and dextrinization procedure carried out in the presence of from 0.02-0.1% by weight d.s.b. (dry substance basis) of an alpha-amylase produced from *Bacillus licheniformis*. The enzyme content given is based upon a unit activity of 120K NOVO units per gram of enzyme product. Briefly stated, the present procedure comprises treating a starch suspension containing in excess of about 25 weight percent starch (d.s.b.), preferably 25-45 weight percent, at temperatures in the range of 100°-115°C. in the presence of the enzyme for a time span within the period of from 1 minute to 1 hour. This treatment effects complete liquefaction of the starch and viscosity reduction to below about 300 centipoises, measured at 95°C. (the viscosity is dependent upon starch concentration). A preferred time temperature liquefaction sequence to obtain both gelation and thinning is about 6 minutes at 105°C. in the presence of 0.05% by wt. (d.s.b.) of a 120K NOVO unit alpha-amylase enzyme product from *B. licheniformis*.

Afterwards, the liquefied thinned starch is cooled e.g. to a temperature level in the range of 80°-100°C., preferably 90°-100°C., and held or soaked at that temperature level for stabilization purposes. The liquefied starch has been dextrinized well, as is evidenced by the 300 cps or less viscosity level of the solution, but its typical DE (dextrose equivalent) of about 10% is not high. The solution is not stable. If the solution were immediately cooled to about 60°C. starch retrogradation might occur, particularly when the starch solution is formed from refractory starch source material such as whole corn or corn starch. The preferred stabilization treatment, namely holding or soaking the liquefied starch at 90°-100°C. and more preferably 95°-100°C., for long enough to raise the DE above about DE 13%, and usually to some predetermined level in the range of DE 15-28%, avoids danger of starch retrogradation on cooling and during subsequent processing.

Although the stabilization treatment causes some viscosity reduction, as for example, from about 300 cps to about 50 cps (at 95°C.), the viscosity reduction cannot be considered an adequate measure for establishing when stability will exist. The actual viscosity of the stabilized solution is largely immaterial, since even an initial about 300 cps solution may readily be processed into sugar products. Nor can treatment time be employed as an adequate measure of stabilization. Preferred stabilization treatment times cannot even be provided. The best measure for stabilization is believed to be DE. A DE of 12% is a rough and ready measure for stability, but the actual minimum DE may have to be determined by trial and error (should minimum stabilization treatment be desired). To a great extent, the minimum stabilization treatment period will depend upon the severity of the liquefaction treatment and the equipment. The stabilization treatment period will depend also upon the initial enzyme content. For example, a DE of about 14% may be reached after a three-hour stabilization holding period at about 95°C. following a liquefaction treatment of 5 minutes at 105°C. with about 0.05% by wt of the enzyme.

According to one mode of this invention, the stabilization treatment may merge with the liquefaction treatment. For example, the heated starch solution may pass directly from a short time stay in the heating means to a heated retaining means for the starch solution (and without quick cooling expedient being employed to reduce the solution temperature). Alternatively, the starch solution may pass to an unheated but insulated retainer. Since the conduit, tank or whatever equipment receives the liquefied starch thereinto will normally lose heat anyway (controllably), the liquefied starch therein will become stabilized if the rate of heat loss is controlled so that the stabilization period is completed before the dextrinized solution cools below about 80°C. In this mode of operation, residence in the actual heating unit will be brief, e.g. 1–10 minutes, but residence time in the stabilization treatment may vary greatly, from less than 1 hour for solutions maintained hot, e.g. 105°C to a somewhat extended period, e.g. 4–6 hours if the solution is allowed to cool quickly to below 100°C (and is then retained in the 90°–100°C range).

In any event the stable dextrinized solution product normally has a 12–28% DE level and is essentially free from undissolved or retrograded starch. Cooling to 60°C does not cause starch retrogradation; the solution is fit for processing into any of the full range of starch hydrolysis products, such as crystalline dextrose, maltose, syrups and the like, without intervention of the process step of heating the dextrin solution above about 120°C. commonly suggested to dissolve unhydrolyzed starch particles. For example, the stabilized solution may be cooled to 60°C. and pH adjusted to about pH 4.5 and thereafter enzymatically converted to a 95% DE syrup (with an amyloglucosidase). Purification procedures, e.g. centrifugation, to remove impurities (like coagulated protein) may be effected on the stabilized solution or deferred until later, as for example, until after a saccharification with an amyloglucosidase.

A trade-off between enzyme usage and treatment time is largely reflected in both the liquefaction and stabilization periods. The stabilization period is proportional to enzyme concentration. Experience has shown that enzyme concentrations below about 0.02 weight percent (of a 120 K NOVO unit product) may involve excessive holding time for stabilization, e.g. in excess of 20 hours, and moreover may be not quite enough to insure sufficient thinning of the starch during the liquefaction treatment. However, the relatively high enzyme concentrations suggested for prior art starch liquefaction procedures have not proven necessary with the alpha-amylase from *B. licheniformis*. Accordingly, the overall enzyme concentration range contemplated for practice of the present invention involves an enzyme content of between 0.02 –1.0 weight percent of the starch. If the enzyme is available in higher or lower unit activity formulation than 120 K NOVO units per gram, then the weight percent of enzyme that must be employed in the present procedure should be changed in proportion to the unit activity.

To a great extent, practice of this invention is possible because the alpha-amylase produced extracellularly by *Bacillus licheniformis* is superior to the prior art alpha-amylase enzymes (most of which are reported to have been produced by *Bacillus subtillus*). In this regard, reference is now made to U.S. Pat. application Ser. No. 40,725, filed May 26, 1970 for detailed teachings regarding the alpha-amylase from *Bacillus licheniformis* including cultivation techniques, identification of preferred strains of the microorganism and properties of this enzyme. It may be noted, however, that although the *B. licheniformis* alpha-amylase is a superior enzyme, its superiority is not reflected by the K NOVO unit activity measurement that has been selected so that enzyme preparations of different relative purity or activity may be related to the requirements. For example, use of the *B. licheniformis* alpha-amylase for cornstarch liquefaction within the preferred 0.02–0.1 wt% (d.s.b.) quantities is based on measurement of unit activity to a 120 K NOVO units per gram of enzyme basis which, by coincidence, is the same unit activity as has been employed for other forms of alpha-amylase, e.g. BAN-120, AQUAZYME-120 (NOVO Industri).

Such coincidence of an apparent identity in enzyme activity (perhaps even enzyme wt content) is almost unfortunate, because it can be extremely misleading. Obviously, a set of standard test conditions are required so that the user might relate the enzyme products from diverse suppliers to his own needs. The K NOVO unit is a recognized standard and can serve as such for practice of this invention. However, advances in the art have made available alpha-amylase enzyme preparations from different source materials, e.g. fungal, microbial, vegetable, etc., which preparations are not equivalent to each other. This standard is meaningful only for comparing unit activities of different enzyme preparations derived from the same source, such as for example, two enzyme preparations dervied from *B. licheniformis* or from *B. subtilis* or two enzymes from the same fungus, etc.

This test is completely unsuitable for relating the *B. subtilis* enzyme to the *B. licheniformis* enzyme. Actually, test conditions for the K NOVO unit involves optimum activity conditions for neither alpha-amylase; and moreover, actual use conditions should be determinative of which source enzyme preparation to employ. Comparison of 120 K NOVO unit alpha-amylase from *B. subtilis* and *B. licheniformis* is made to demonstrate the limited applicability of activity standards to enzyme selection. Each enzyme tested individually under its own optimum conditions exhibits a far higher unit activity than 120 K NOVO units/gm. However, the alpha-amylase from *B. licheniformis* exhibits the greater unit activity (at its optimum conditions) than the alpha-amylase from *B. subtilis* (at its own optimum conditions). Since the alpha-amylase from *B. licheniformis* is almost non-dependent on calcium ions and has a greater thermal stability than the alpha-amylase from *B. subtilis*, test conditions can be devised (e.g. phosphate buffered starch solution tested at 95°C.) wherein a *B. licheniformis* alpha-amylase enzyme of 120 K NOVO unit/gm is highly active, but the *B. subtilis* alpha-amylase is completely inactive or nearly so. If an intended use condition corresponded to those test conditions, no quantity of a 120 K NOVO unit *B. subtilis* enzyme could substitute for the 120 K NOVO unit *B. licheniformis* enzyme.

The use conditions of the present invention are essentially beyond the capabilities of the *B. subtilis* alpha-amylase. The upper end of the temperature-time ranges suggested for practice of this invention are believed to be beyond the levels for deactivation of *B. subtilis* alpha-amylase. Indeed, even for starch liquefaction with *B. licheniformis* enzyme, it should be understood that the time-temperature ranges of 100°–115°C., 1 minute to 1 hour are in some sort of inverse relationship, one to the other.

In actual practice of this invention, the treatment time and temperature may have to be determined experimentally for any given starchy material and starch concentration. The desired DE level for the dextrin solution may affect this relationship too. For example, treatment for about one hour at 105°C. with 0.05 wt% (120 K NOVO unit) alpha-amylase d.s.b. of a 33% starch suspension resulted in a dextrin solution with a DE of 12%. The enzyme was almost inactivated at this point. Extended treatment at 105°C. did not result in further increase in DE.

An undifferentiated combined liquefaction, thinning and stabilization treatment at 100°–115°C. is a preferred treatment mode for preparing low DE solutions. If the objective is a higher DE solution, then a preferred treatment mode is thinning and liquefying the starch suspension 5–10 minutes at 105°–110°C. followed by temperature reduction to 95°–100°C. and holding at that level e.g. three hours. The alpha amylase from *B. licheniformis* is well suited to practice of this invention. Certainly its relative stability at above 100°C. in the presence of a starch substrate is consistent with the need for avoiding peak starch gel viscosities so high as to make the starch solution an essentially unworkable solid mass. The highly desirable low enzyme concentrations of 0.02–0.10 wt% d.s.b. already alluded to are feasible with this alpha-amylase. In addition, sufficient enzymatic activity survives exposure to the starch liquefying and thinning conditions to stablilize the starch solution. If the liquefying and thinning treatment is a relatively short time treatment, sufficient enzymatic activity survives to cause appreciable dextrinization during a stabilization holding period. The stabilized solution will have a D.E. content in the range of 12–28% D.E., and moreover the actual D.E. may be predetermined.

The process of the present invention is quite flexible, with considerable engineering trade-off possibilities, other than in the quantity of enzyme employed. As has already been pointed out, for a low D.E. level, e.g. 14% D.E. from a 35% d.s.b. starch solution, the liquefaction and stabilization steps may be merged into a unitary treatment at 105°C. However, if the desired D.E. is within the 20°–28° range, the liquefaction treatment and stabilization holding are quite distinct e.g. 5 minutes at 105°C., then folding at 95°C. In either instance, complete dextrinization has taken place and the solution may be cooled for further processing without starch retrogradation.

Advantageously, the starch pasting operation may be effected in the rapid heating equipment for acid hydrolysis of starch suspension. Such equipment provides for rapid heating e.g. by introducing steam directly into a continuously flowing starch suspension to heat the starch suspension from a temperature of below about 60°C. to treatment temperature levels virtually instantaneously. Practice of the present invention contemplates placement of an appropriately sized pressurized tailpipe at the outlet of the rapid heater unit, so that the starch suspension remains at the liquefying and thinning temperature level e.g. 105°C. for the predetermined residence period.

In one of the preferred exemplary embodiments of this invention already alluded to, the tailpipe extends into a pressurized heated column or tank so that the starch solution may be retained at the same elevated temperature for in excess of one hour for combined liquefying and stabilizing treatment. In another of the preferred exemplary embodiments of this invention already alluded to, the tailpipe extends into a column or tank adapted to release the pressure (flash cooling the solution), the column being large enough to retain the starch solution at 90°–100°C. for the preselected holding period.

Such equipment and equipment arrangements are well known to the art and need not be described further.

For further understanding of the invention, the following specific examples are presented.

In the examples, viscosities are determined using a Brookfield Viscosimeter type RVF Spindel 2, 20 rpm, temperature 95°C.

EXAMPLE I

To a 35% by wt. d.s.b. cornstarch suspension in tap water, pH 6.4, hardness 10° German hardness, preheated to 60°C. and with 0.1 wt% d.s.b. of the *B. licheniformis* derived alpha-amylase (THERMAMYL) added thereto, was passed continuously (900l/hr) through a steam injector heater whose tailpipe was connected to an insulated externally heated upflow column. The starch suspension was heated to 105°C. Total treatment time at 105°C. was between 6 and 7 minutes. Thereafter the starch solution was flash cooled to 95°C. and passed into a tank kept at 95°C. to effect a stabilization and dextrinization holding period of 1 hour. The final solution had a 18% DE.

Observation before and after the 95°C. holding period indicated that liquefaction and thinning had effected manageable viscosities (about 300 cps at 95°C.), and that the 95°C. holding period reduced the viscosity nominally, (estimated 40 cps) at 95°C.

The substantial protease content in this particular alpha-amylase was most rapidly deactivated by the 105°C. treatment conditions, and had no effect on the proteinaceous impurities present in the starch.

After the 95°C. holding period, the dextrin solution was cooled to 60°C. pH adjusted to 4.5 and treated with amyloglucosidase (AMG 75 in amount equal to 2.5 liters/ton starch d.s.b.) for a 48-hour period. The resulting glucose syrup exceeded 95% DE. After filtration and other purification (including ion exchange) the syrup was concentrated; a high quality crystalline dextrose product was recovered therefrom.

EXAMPLE II

A 33% by wt d.s.b. suspension of corn starch in tap water (pH 6.8, 7° German hardness) was treated with 0.05% by wt (d.s.b.) of THERMAMYL at 105°C. for 1.5 hours in the same steam injector and tank (pressure not released). The resulting dextrin solution had 12.2% DE and was stable against retrogradation upon cooling to 60°C. A sample taken from the tailpipe representing about 5 minutes treatment at 105°C. exhibited manageable viscosities (of the order of about 300 cps) and about a 10% DE.

EXAMPLE III

In the same equipment arranged as in Example I a 37% by wt d.s.b. cornstarch suspension in tap water (pH 6.2, 13° German hardness) was treated with 0.05 wt% d.s.b. of THERMAMYL at 105°C. for 5 minutes, then held at 95°C. for 6 hours during which holding period the DE, increased from about 10% DE to 20% DE. The viscosity of the starch solution leaving the tail pipe was 300 cps and the final dextrinized solution at about 30 cps.

EXAMPLE IV

A 39% by wt d.s.b. suspension of wheat starch in tap water was treated with 0.05% d.s.b. of THEREMAMYL in the THERMANYL apparatus as in Example I for 6.7 minutes at 105°C. Thereafter the starch was flash cooled to 95°C. and passed into the tank kept at 95°C.

The pH and Ca content of the initial suspension was 7.6 and 16°dH (German hardness).

After 1 hour at 95°, the starch was cooled to 60°C. and pH adjusted to 4.5. A satisfactory protein separation was observed and there was no tendency to retrogradation. Amyloglucosidase (2.5 liters AMG 75/5 d.s.b) was added and after 50 hours the DE was 96.5%.

EXAMPLE V

A 37–40% by wt d.s.b. suspension of corn starch in tap water was treated in the apparatus described in Example I at different temperatures and pHs with 0.05% of TERMAMYL (d.s.b.). Samples were withdrawn right after the 5 minutes holding column and placed in an oil bath at 95°C. for 20 hours. The DE obtained after 20 hours can be regarded as a measure of the residual enzyme concentration leaving the column.

The results are tabulated below.

| Test No. | d.s.b. % | Temp. °C. | Time min. | pH | Hardness dH | DE after 20 hrs. (95°C.) |
|---|---|---|---|---|---|---|
| B1 | 37 | 105 | 5.1 | 6.35 | 13 | 28.5 |
| C2 | 37 X | 105 | 5.5 | 6.65 | 0 | 28.0 |
| D1 | 40 XX | 105 | 5.8 | 5.8 | 14 | 25.0 |
| D2 | 40 XX | 105 | 9.1 | 5.6 | 15 | 20.0 |
| D3 | 40 XXX | 105 | 6.3 | 5.6 | 13 | 26.0 |
| B4 | 37 | 110 | 5.3 | 6.45 | 7 | 27.3 |
| B6 | 37 | 115 | 5.3 | 6.50 | 8 | 21.8 |
| B7 | 37 | 120 | 6.7 | 6.50 | 7 | immeasurable |
| B8 | 37 XX XXXX | 120 | 0.15 | 6.25 | 9 | 14.7 |

X- The cornstarch was suspended in de-ionized water and pH was adjusted to 6.5 with H$_2$SO$_4$ (20%)
XX- pH adjusted with H$_2$SO$_4$ (20%)
XXX- pH adjusted with H$_2$SO$_4$ (20%) and 1g KNO$_3$/litre added
XXXX- The sample was withdrawn after the steam injector before the column, thus giving a very low holding time The syrups resulting from exp. no. D2, B7 and B8 were retrograded and unacceptable from a practical point of view.

The data of table I surprisingly show that the enzyme treatment can be effected at as high a temperature as 115°C. Furthermore, the enzyme stability is independent of Ca-ion concentration, which is evident from exp. no. C2 and the low Ca++ hardness in the rest of the experiments.

The influence of pH is negligible down to 5.6, at which pH the liquefaction procedure results in a syrup with a significantly lower DE and with a tendency to retrograde during flash cooling from 105°C. to 95°C. This is, however, only true at low ionic strength. If salts (e.g. KNO$_3$) are added, the pH might be as low as 5.6 and even lower without this effect.

What is claimed:

1. A process for combined liquefaction and thinning of starch which comprises treating an aqueous suspension containing therein in excess of 25% by weight of a starch material and from 0.020.10% by weight of alphaamylase based upon dry starch content and upon an enzymatic activity of 120 K NOVO units per gram of enzyme preparation, the alphaamylase being the alpha-amylase produced by *B. licheniformis*, the treatment being at a temperature in the range of 100°–115°C. for a time period in the range of 1–60 minutes producing thereby a liquefied thinned starch solution of a viscosity less than about 300 c.p.s. measured at 95°C.

2. The process of claim 1 wherein the said treatment in the temperature range of 100°–115°C. is continued until the starch solution has so high a DE that the solution is stable against starch retrogradation upon cooling, the DE being at least about 12%.

3. The process of claim 1 wherein the said treatment is followed by cooling the liquefied thinned starch solution to a temperature in the range of 80°–100°C. and holding the solution at such temperature until the D.E. has increased to a level where the solution is stable against starch retrogradation upon further cooling, the DE being at least about 12%.

4. The process of claim 3 wherein the cooling is effected to a temperature in the range of 90°–100°C.

5. The process of claim 1 wherein the starch material is selected from the group consisting of cornstarch and whole ground corn.

6. A process for achieving a stable dextinized starch solution which comprises treating an aqueous suspension containing therein in excess of 25% by weight of a starch material and from 0.02–0.10% by weight of alpha-amylase based upon dry starch content and upon an enzymatic activity of 120 K NOVO units per gram of enzyme preparation, the alpha-amylase being the alpha-amylase produced by *B. licheniformis*, the treatment being in the range of 105°–110°C. for 5–10 minutes whereby a liquefied and thinned starch solution results, thereafter cooling the resulting starch solution to a temperature in the range of 90°–100°C., and holding the solution at that temperature until the D.E. rises to a level where the solution is stable against starch retrogradation upon further cooling, the D.E. being at least about 12%.

7. The process of claim 6 wherein the cooling and holding temperature level is in the range of 95°–100°C.

8. The process of claim 7 wherein the starch material is selected from the group consisting of cornstarch and whole ground corn.

* * * * *